S. H. TINSMAN.
PLANTER.
APPLICATION FILED NOV. 15, 1909. RENEWED AUG. 28, 1911.
1,004,942.
Patented Oct. 3, 1911.
2 SHEETS—SHEET 1.
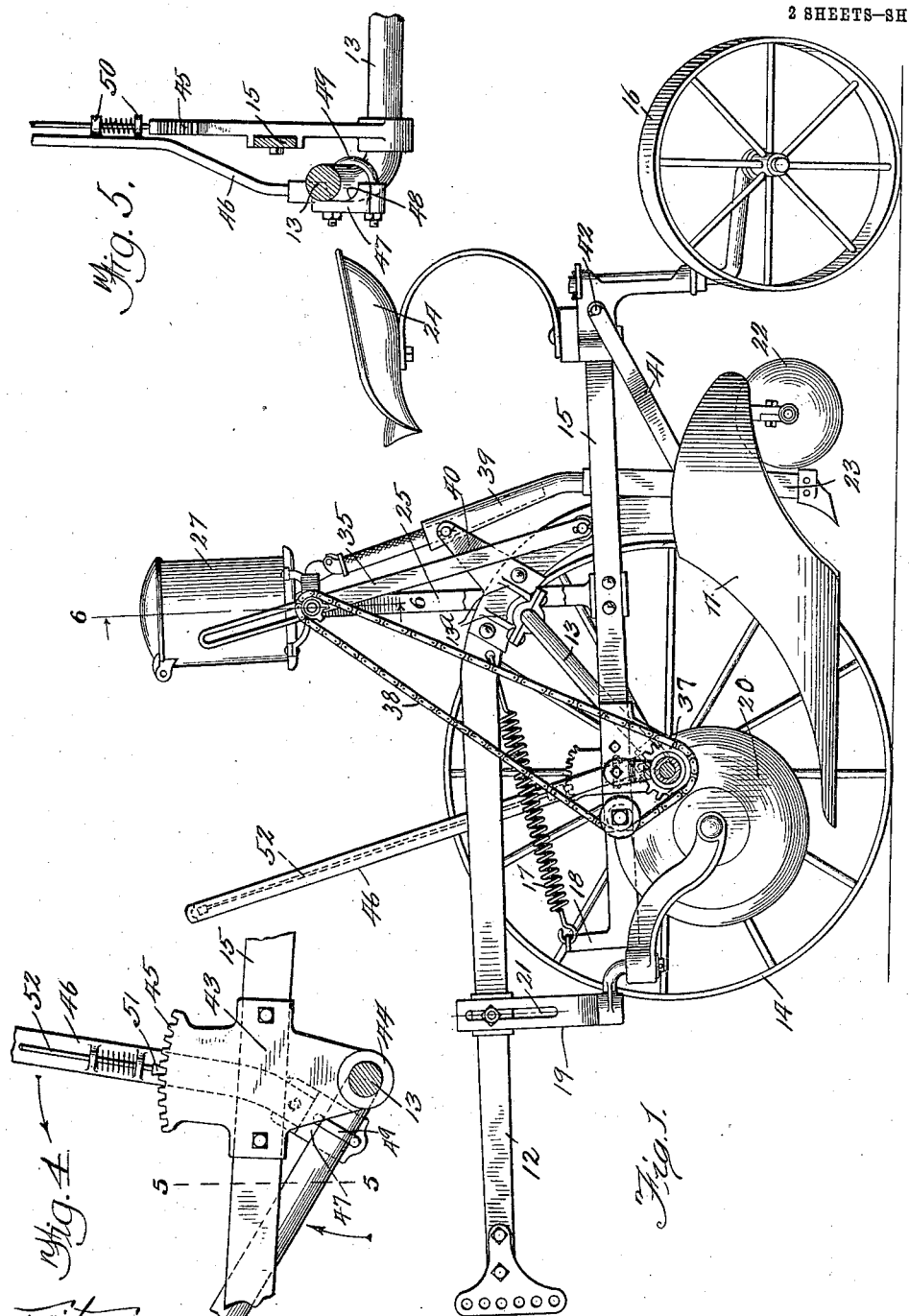

S. H. TINSMAN.
PLANTER.
APPLICATION FILED NOV. 15, 1909. RENEWED AUG. 28, 1911.
1,004,942.
Patented Oct. 3, 1911.
2 SHEETS—SHEET 2.
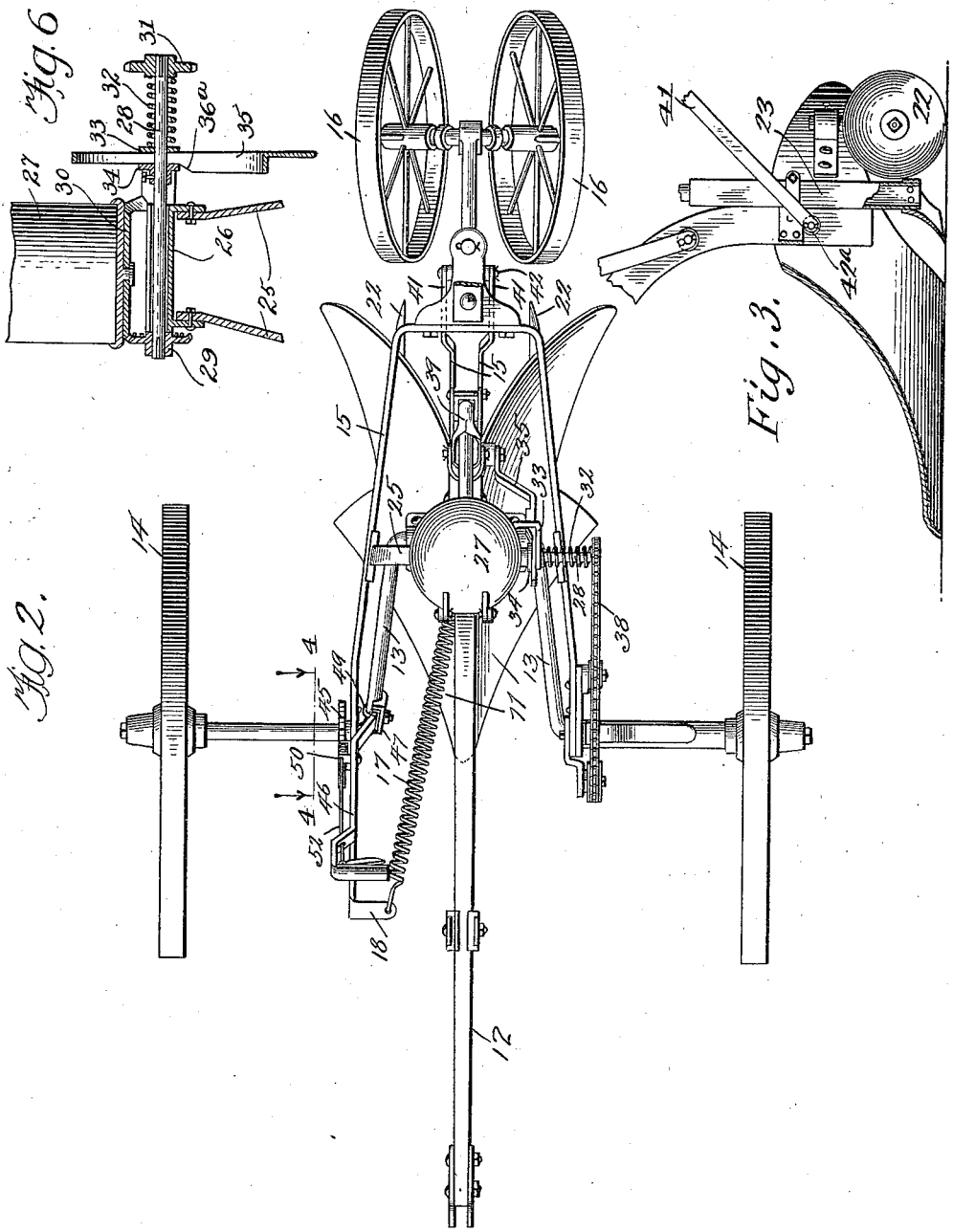

UNITED STATES PATENT OFFICE.

SAMUEL H. TINSMAN, OF ST. JOSEPH, MISSOURI.

PLANTER.

1,004,942.  Specification of Letters Patent.  Patented Oct. 3, 1911.

Application filed November 15, 1909, Serial No. 528,195. Renewed August 28, 1911. Serial No. 646,416.

*To all whom it may concern:*

Be it known that I, SAMUEL H. TINSMAN, a citizen of the United States of America, and resident of St. Joseph, county of Buchanan, State of Missouri, have invented a certain new and useful Improvement in Planters, of which the following is a specification.

My invention relates to seed-planting machines of the type known as listers—that is to say, planting machines in which a double mold board furrow-opener is combined with seed-dropping mechanism operated by the supporting wheels of the planter, and in which the corn or other seed is dropped in the furrow made by said furrow-opener as the planter is drawn over the field.

Generally stated, the object of my invention is the provision of an improved and highly efficient seed-planting machine of the so-called lister type.

A further object is to provide improved means for raising and lowering the furrow-opener in the frame, and to provide means for giving increased rigidity to the structure.

These and such other objects as may hereinafter appear are attained by my invention, as illustrated in the accompanying drawings, in which—

Figure 1 is a side elevation of a planter embodying the principles of my invention, the near wheel being removed. Fig. 2 is a top plan view of Fig. 1. Fig. 3 is a longitudinal sectional view through the furrow-opener. Fig. 4 is a detail of the lever 46 and its connection with the axle, taken on line 4—4 of Fig. 2. Fig. 5 is a sectional view taken on line 5—5 of Fig. 4. Fig. 6 is an enlarged sectional view on line 6—6 of Fig. 1, looking in the direction of the arrows.

Like numerals of reference indicate like parts in the several figures of the drawings.

Referring now to the drawings—11 represents a double mold furrow-opener plow mounted on a forwardly extending beam 12. A bail-shaped axle 13 is supported in bail hangers on the frame 15 and on its outer ends are mounted the hubs of the wheels 14. On the upper portion of the bail axle 13 is loosely mounted a bearing casting 13ª, which is rigidly secured to the plow beam well toward the rear, the beam being supported by the bail axle 13. The U-shaped body frame 15 is supported at its rear end by the double caster wheel 16 free to swing or caster from side to side. A spring 17 connects an extension or lug 18 on the front of the frame with the beam of the furrow-opener, thus assisting in raising it from the ground. A forked member 19 is mounted on the beam in which is mounted a colter 20 adapted to travel ahead of the furrow-opener. The arms of the forked member fit on either side of the beam and are slotted as shown at 21, permitting the vertical adjustment of the colter. A pair of rotary covering disks 22 are secured to the rear ends of the mold boards of the furrow-opener and positioned to throw the dirt over the seed dropped from the spout 23. A driver's seat 24 is mounted on the rear of the frame 15.

Extending upwardly from the frame on either side are supports 25 connected at the top by a casting or bearing 26, providing a support for the hopper 27 provided with any suitable seed-dropping mechanism. This seed-dropping mechanism is operated by a horizontal shaft 28 supported in the bearing 26 and provided with a bevel gear 29 engaging the rotary plate 30 on the bottom of the hopper. A sprocket wheel 31 is secured to the other end of the shaft 26 and a spring 32 is supported between the sprocket wheel and a bracket arm 33 extending around from the casting 26. A collar 34 is keyed or secured to the shaft, and a slotted arm 35 is interposed between the collar and the bracket arm 33. This arm is provided with a cam face 36ª, and at its lower end is pivotally connected with the beam 12 at 36. A sprocket wheel 37 is secured to a sleeve on the axle connecting with the adjacent wheel 14. A sprocket chain 38 connects the sprocket wheel 37 with the sprocket wheel 31 on the shaft 28. It is thus seen that when the planter is traveling with the furrow-opener in the ground, the bevel gear 29 is operated through the medium of the sprocket wheels and chains above described, and the seed plate is revolved, as clearly shown in Figs. 1 and 6, the seed passing down through the pipe 38 and into the conductor 39, through the spout 23 into the furrow made by the furrow-opener. The conductor 39 is supported in the yoke end 40 of the casting 13ª.

When the furrow-opener is raised from the ground, as shown in Fig. 1, the cam face 36ª on the arm 35 throws the bevel gear out of engagement with the gear on the seed-plate 30, thereby rendering the seed-dropping mechanism inoperative. A pair of connecting straps 41 are pivotally mounted on the rear of the frame at 42 and to the end of the beam 12 at 42ª.

Referring now more particularly to Figs. 4 and 5: Rigidly mounted on the frame 15 is a bail hanger 43 terminating at its lower end in a bearing 44 for the axle 13, and at its upper end in a rack 45. An operating lever 46 is rigidly mounted on the axle by means of a grooved casting 47, the axle fitting within the groove 48 and held in place by means of a U-bolt 49. An ordinary spring container 50 is mounted on the lever, and the dog 51 thrown into and out of engagement by means of the rod 52. It will thus be seen that when the lever 46 is thrown out of locking engagement with the rack 45, the beam and furrow-opener drops of its own weight and is forced into the ground. This movement is opposed by the spring 17, so when it is desired to raise the furrow-opener and the lever 46 is thrown back, the spring assists in the raising. The straps or swinging link connections 41 form a flexible connection between the rear of the frame and the beam, and serve in lieu of a second bail, and extending rearwardly in the same general direction as the rearwardly-extending bail axle gives a degree of rigidity to the structure not heretofore possessed in implements of this character. The single bail extending rearwardly is the principal support for the plow, and taken in connection with the link connections, gives a simpler construction and at the same time one as efficient as those in which two bails are employed.

I claim:

In a planter, a U-shaped frame, a rearwardly and upwardly extending bail axle journaled in a bearing on the forward end portions of said frame, a beam mounted on said axle and extending above said frame, a furrow opener attached to said beam, seed dropping mechanism mounted on said frame, a seed spout extending from said seed dropping mechanism to a point to the rear of said furrow opener and attached to said furrow opener, a forwardly and downwardly extending swinging link attached to the rear end of said frame and the lower end of said beam to steady said furrow opener and seed spout, means for rocking said axle downwardly and rearwardly to lower said furrow opener and upwardly and forwardly to raise the same, and an arm connected directly to said beam and provided with means for automatically connecting and disconnecting the seed dropping mechanism when the furrow opener is lowered and raised.

Signed by me at Chicago, Illinois, this 1st day of November, 1909.

SAMUEL H. TINSMAN.

Witnesses:
E. H. CLEGG,
WM. B. N. WINION.

---

Copies of this patent may be obtained for five cents each, by addressing the "Commissioner of Patents, Washington, D. C."